April 21, 1953 O. M. SCHMIDT Re. 23,648

THREAD CARRIER

Original Filed Jan. 14, 1948

Otto M. Schmidt
INVENTOR.

BY Clarence A. O'Brien and Harvey B. Jacobson
Attorneys

Reissued Apr. 21, 1953

Re. 23,648

UNITED STATES PATENT OFFICE 23,648

THREAD CARRIER

Otto M. Schmidt, Newtown Square, Pa., assignor, by mesne assignments, to Textile Machine Works, Wyomissing, Pa., a corporation of Pennsylvania Original No. 2,569,904, dated October 2, 1951, Serial No. 2,224, January 14, 1948. Application for reissue November 21, 1952, Serial No. 321,964

14 Claims. (Cl. 66—126)

Matter enclosed in heavy brackets [ ] appears in the original patent but forms no part of this reissue specification; matter printed in italics indicates the additions made by reissue.

The present invention relates to new and useful improvements in thread carriers and more particularly to thread carriers for full fashioned hosiery knitting machines and the like, wherein the thread is payed out through a replaceable thread guiding tube which is removably mounted on the thread carrier.

An important object of the invention is to provide a thread carrier designed to prevent costly damage to sinkers and needles as well as to other parts of the machine and which is an objectionable feature to the present type of high speed hosiery machine. To overcome this objection I provide a turret in which the thread carrying tube is mounted whereby the tube may swing toward either side out of line with the sinkers and needles and thus prevent damage to these parts.

A further object of the invention is to provide a removable mounting for the thread carrying tube to facilitate replacement thereof without removing the carrier from the machine.

A still further object is to provide a device of this character of simple and practical construction, which is efficient and reliable in operation, relatively inexpensive to manufacture, and otherwise well adapted for the purposes for which the same is intended.

Figure 1:
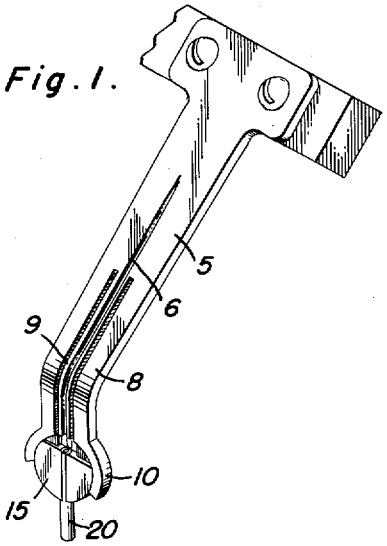
Figure 2:
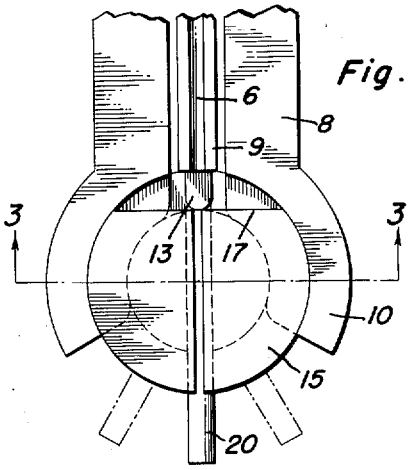
Figure 3:
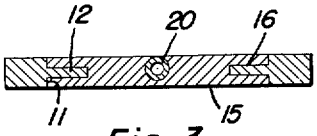
Figure 4:
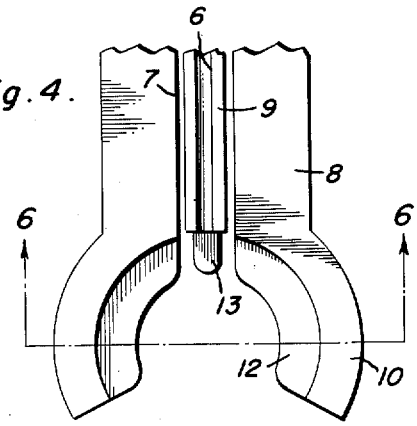
Figure 5:
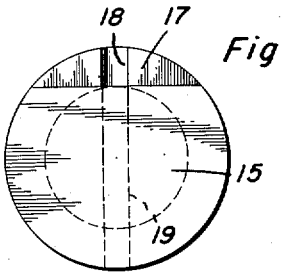
Figure 6:
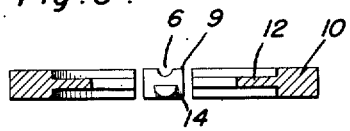

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the thread carrier with the tube supporting turret mounted in position therein, Figure 2 is an enlarged front elevational view, Figure 3 is a transverse sectional view taken substantially on the line 3—3 of Figure 2, Figure 4 is an enlarged fragmentary front elevational view with the turret and thread carrying tube removed, Figure 5 is a plan view of the turret, and Figure 6 is a transverse sectional view taken substantially on the line 6—6 of Figure 4.

Referring now to the drawings in detail, wherein for the purpose of illustration I have disclosed a preferred embodiment of the invention the numeral 5 designates the thread carrier which comprises substantially a metal strap having a thread guiding groove 6 of gradually increasing depth and width extending longitudinally thereof toward its free end. The carrier 5 is provided with a pair of spaced parallel longitudinally extending slots 7 extending inwardly from its free end to provide a pair of fingers 8 at the side edges of the carrier at each side of a central finger 9 which carries the groove 6.

The outer ends of the fingers 8 are curved oppositely to form arcuate jaws 10, the inner edges of the upper and lower surfaces of which are rabbeted as shown at 11 to form an inwardly projecting arcuate flange 12 on the opposed edges of the jaws 10 and positioned midway between the upper and lower surfaces of the jaws as shown more clearly in Figure 3 of the drawings.

The end of the central finger 9 is formed with an outwardly extending tongue 13 of semi-cylindrical form to provide a rounded under surface as shown at 14.

A turret in the form of a disc 15 is formed in its peripheral edge with a groove 16 to receive the flanges 12 of the jaws 10 by sliding the turret inwardly between the jaws to rotatably lock the turret therebetween by a snapping action.

The upper surface of the turret 15, at its inwardly disposed edge, is cut away or rabbeted as shown at 17 to expose the inner edges of the flanges 12 and a groove 18 is formed in the rabbeted portion 17 to receive the tongue 13 in a snapping action.

A bore 19 extends transversely of the turret 15 in alignment with the groove 18 and in which a thread carrying tube 20 is removably positioned, the outer end of the tube projecting outwardly beyond the outer edge of the turret.

In the operation of the device, the turret 15 with the thread carrying tube 20 therein is snapped into position between the jaws 10 by sliding the turret inwardly on the flanges 12 and with the tube held aligned with groove 6 by tongue 13 snapped in groove 18 of the turret.

The turret is free to swing toward either side should the outer end of tube 20 strike the sinkers or needles of the machine (not shown) to thus prevent damage to the machine.

The outer end of carrier 5 is curved downwardly at a desired angle in accordance with the type of knitting machine on which the same is used.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A thread carrier for knitting machines comprising a supporting arm having a longitudinal thread guide groove, a thread guide rotatably mounted in a recessed position in the outer end of said arm, and catch means holding the guide stationary and in alignment with said groove.

2. A thread carrier for knitting machines comprising a supporting arm having a longitudinal thread guide groove, a flat rotatable member at the outer end of the arm, and a thread guide carried by said member and aligned with said groove, said rotatable member automatically swinging the guide toward one side of the arm upon striking of the guide with a part of the machine.

3. A thread carrier for knitting machines comprising a supporting arm, a disk-like member rotatably carried at the outer end of the arm, catch means releasably holding the member in a fixed position on the arm, and a thread guide carried by said member.

4. A thread carrier for knitting machines comprising a supporting arm having a free end, a disk-like member rotatably mounted in a coplanar position at the free end of the arm, and a thread guide carried by said disk-like member.

5. A thread carrier for knitting machines comprising a supporting arm, a pair of resilient arcuate jaws at the outer end of the arm, and a turret swingably held between the jaws and having a thread guide tube.

6. A thread carrier for knitting machines comprising a supporting arm having a turret seat at its outer end, a turret swingably held on the seat in a coplanar position with the arm, and a thread guide tube carried by the turret.

7. A thread carrier for knitting machines comprising a supporting arm, a pair of arcuate resilient jaws at the outer end of the arm, a turret swingably carried by the jaws and held therein by a snap action, and a thread guide tube carried by the turret.

8. A thread carrier for knitting machines comprising a supporting arm constructed to provide a pair of spaced parallel fingers having arcuate jaws at their outer ends, and a central finger between said pair of fingers and having a thread guide groove therein, a locking tongue on the outer end of the central finger, a flat turret swingably carried between the jaws and having a seat for the tongue to hold the turret stationary, and a thread guide tube carried by the turret.

9. A thread carrier for knitting machines comprising a supporting arm constructed to provide a pair of spaced parallel fingers having arcuate jaws at their outer ends, and a central finger between said pair of fingers and having a thread guide groove therein, a locking tongue on the outer end of the central finger, a flat turret swingably carried between the jaws and having a seat for the tongue to hold the turret stationary, and a thread guide tube carried by the turret, and projecting radially therefrom for automatically swinging the turret toward one side upon interference of the tube with a part of the machine.

*10. A thread carrier for a full fashioned knitting machine comprising a supporting arm, a turret carried by said arm for rotation on an axis at substantially right angles to the adjacent part of said arm, and a thread guide tube mounted in said turret at substantially right angles to said axis.*

*11. A thread carrier for a full fashioned knitting machine comprising a supporting arm having an end portion with an opening therein, a turret mounted in said opening for rotation on an axis at substantially right angles to said end portion, and a thread guide tube mounted in said turret at substantially right angles to said axis.*

*12. A thread carrier for knitting machines comprising a supporting arm having an end portion with an opening therein, a turret mounted in said opening for rotation on an axis at substantially right angles to said end portion, a thread guide tube mounted in said turret at substantially right angles to said axis, and catch means for releasably holding said turret and tube in predetermined position on said end portion.*

*13. A thread carrier for knitting machines comprising a supporting arm having an end portion with an opening therein, a turret mounted in said opening for rotation on an axis at substantially right angles to said end portion, a thread guide tube mounted in said turret at substantially right angles to said axis, and catch means in part on said end portion for releasably holding said turret in a predetermined position.*

*14. A thread carrier for a full-fashioned knitting machine comprising a supporting arm having an end portion, a turret carried by said end portion for rotation on an axis at substantially right angles to the end portion, a thread guide tube mounted in said turret at substantially right angles to said axis and catch means for releasably holding said turret and tube in predetermined position on said end portion.*

OTTO M. SCHMIDT.

References Cited in the file of this patent or the original patent

UNITED STATES PATENTS

| Number | Name | Date |
|---|---|---|
| 1,675,627 | Williard | July 3, 1928 |
| 1,893,808 | Spector | Jan. 10, 1933 |
| 2,026,514 | Weisbecker | Dec. 31, 1935 |
| 2,087,830 | Wrightson | July 20, 1937 |
| 2,104,815 | Richter et al. | Jan. 11, 1938 |
| 2,453,513 | Jauch | Nov. 9, 1948 |